(No Model.)
J. T. SANGSTON.
EVAPORATOR.
No. 305,479. Patented Sept. 23, 1884.
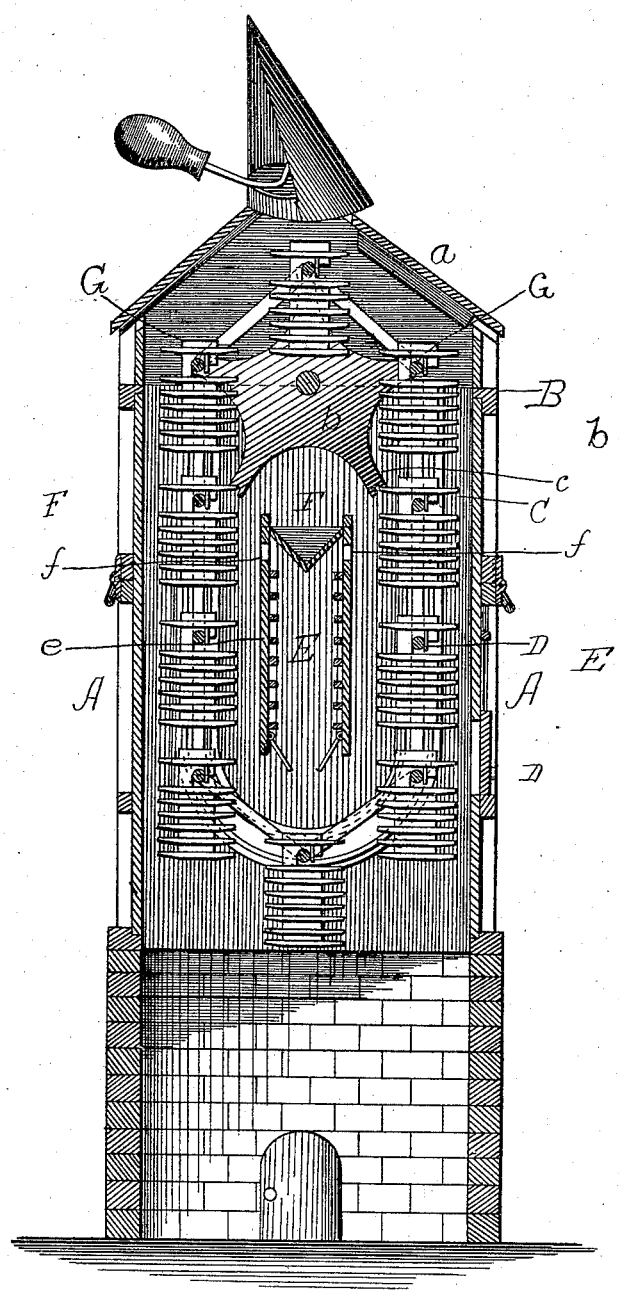
WITNESSES
W. E. Bowen
Chas. R. Burr
INVENTOR
John T. Sangston
A. P. Webb
Attorney

UNITED STATES PATENT OFFICE.

JOHN T. SANGSTON, OF GREENSBOROUGH, MARYLAND.

EVAPORATOR.

SPECIFICATION forming part of Letters Patent No. 305,479, dated September 23, 1884.

Application filed October 15, 1883. (No model.)

*To all whom it may concern:*

Be it known that I, JOHN T. SANGSTON, a citizen of the United States, residing at Greensborough, in the county of Caroline and State of Maryland, have invented certain new and useful Improvements in Evaporators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention has relation to devices for drying fruit and the like, and is designed as an improvement upon the patent granted to W. H. Wiley, June 13, 1882.

The improvements consist, mainly, in the novel construction of the central or finishing chamber, having hot-air apertures for the admission of the air to the trays upon the endless chain or carrier, and a closed top having an under deflector-surface arranged just above the said openings, as will be hereinafter more fully set forth, and particularly pointed out in the claims appended.

In the accompanying drawing is represented a longitudinal vertical section of my invention.

The device shown by the patent above referred to is of a construction similar to the following: The case A, having a sloping top, *a*, is provided near its upper end with a horizontal shaft, B, which extends transversely within the frame, to which is secured, at opposite sides within the said case or frame, plates *b*, having radial arms *c*, the outer ends of which are recessed, as shown at C. Passing around the upper portions of the recessed plates *b* is an endless chain carrying trays H, said chain being composed of a number of shafts, D, which are connected together at or near the ends by means of links G, that have each end pivoted to or upon one of said shafts. The length of each of said shafts is such as to permit it to extend between said plates, with its ends resting within the recesses of the radial arms, while the lengths of said links correspond to the distance in a direct line between two of said recesses, whereby when the said plates are caused to revolve by power being applied to the shaft B the said shafts D will successively engage with the plates, as shown. The plates act as sprocket-wheels upon the shafts of the carrier.

E indicates the central or finishing chamber, which is provided on opposite inner sides with a number of lugs, *e*, arranged horizontally for supporting trays containing fruit. This chamber is provided with a closed top, F, which extends down within the chamber below the upper edge of the openings *f*, and has its under surface converging, so as to deflect the hot air from the said chamber to the trays on the endless carrier, and passes both over and around the fruit thereon.

Above the frame is arranged a cone-shaped top, G, which has a vertical lateral opening, as shown, and a damper or regulator, *h*, for opening and closing the central aperture for the outlet of the hot air.

From the foregoing description the operation of my invention will be obvious.

Having thus described my invention, what I claim as new, and desire to secure by Letters Patent, is—

1. The combination, with a fruit-drier, of the central finishing-chamber having lateral apertures near its upper end, and a deflector-cap having its inclined walls extending within the chamber below the lateral openings, substantially as specified.

2. The combination, in a fruit-drier of the character described, of the finishing-chamber E, provided with lugs or ledges for supporting the fruit-trays, and lateral openings *f*, for the discharge of hot air, and the cap F, converging within the said chamber to a point beneath the said lateral openings, substantially as specified.

In testimony whereof I affix my signature in presence of two witnesses.

JOHN T. SANGSTON.

Witnesses:
WM. H. CUNEGY,
W. T. JARMAN.